A. E. HEATH.
APPARATUS FOR HANDLING OF GRAIN IN BULK.
APPLICATION FILED DEC. 4, 1919.
1,390,032.
Patented Sept. 6, 1921.
3 SHEETS—SHEET 3.
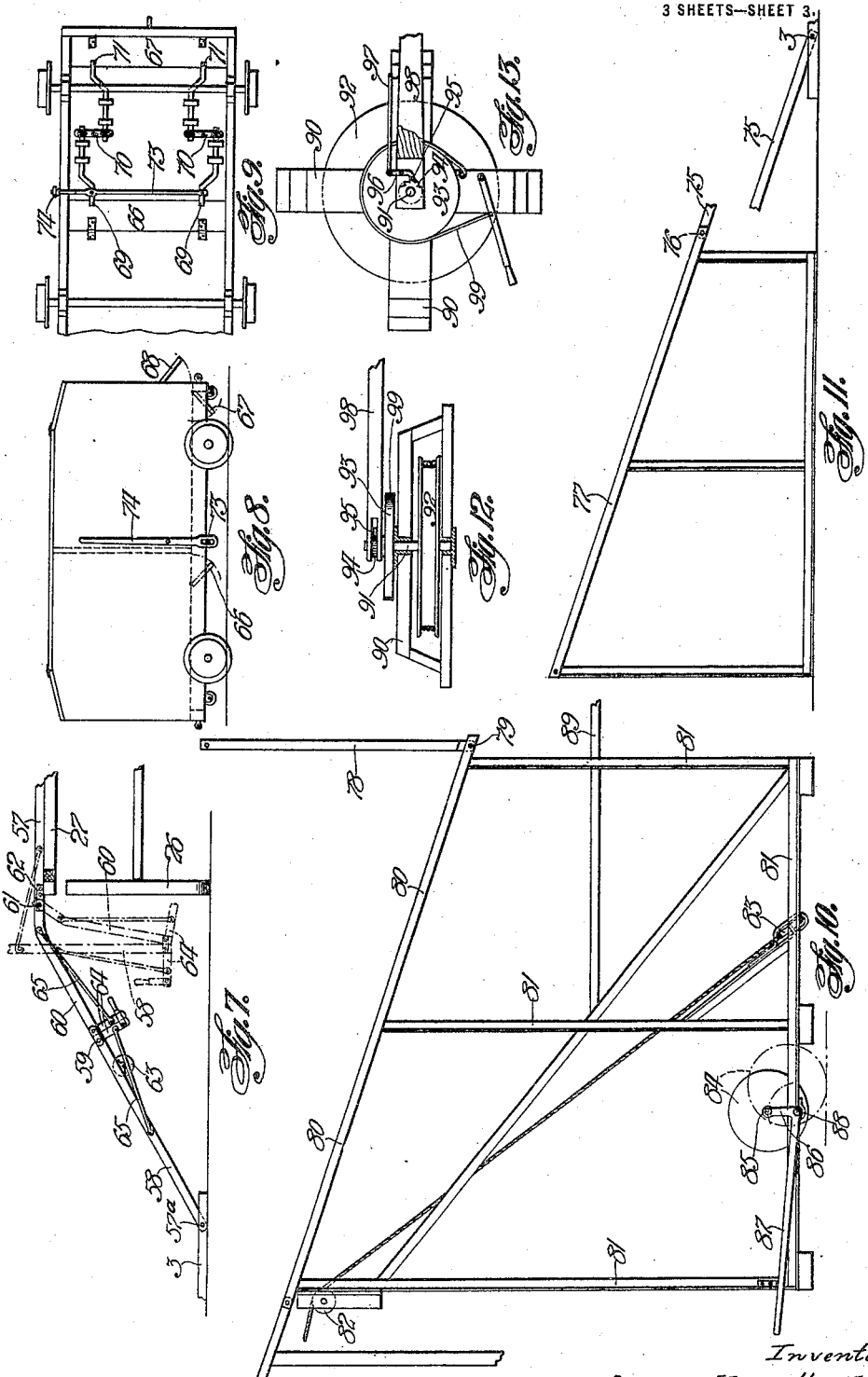
Inventor:
Andrew Edwin Heath

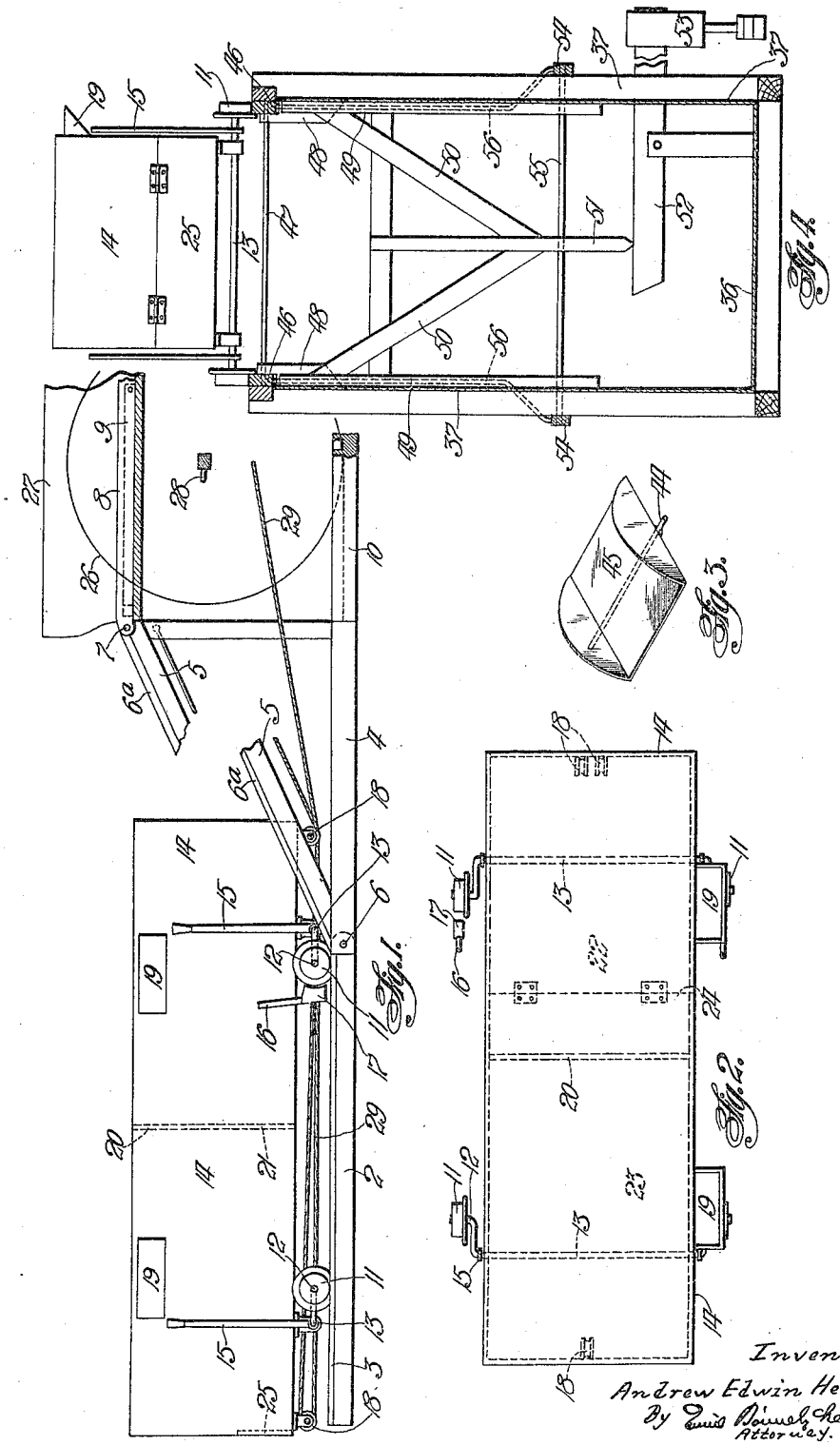

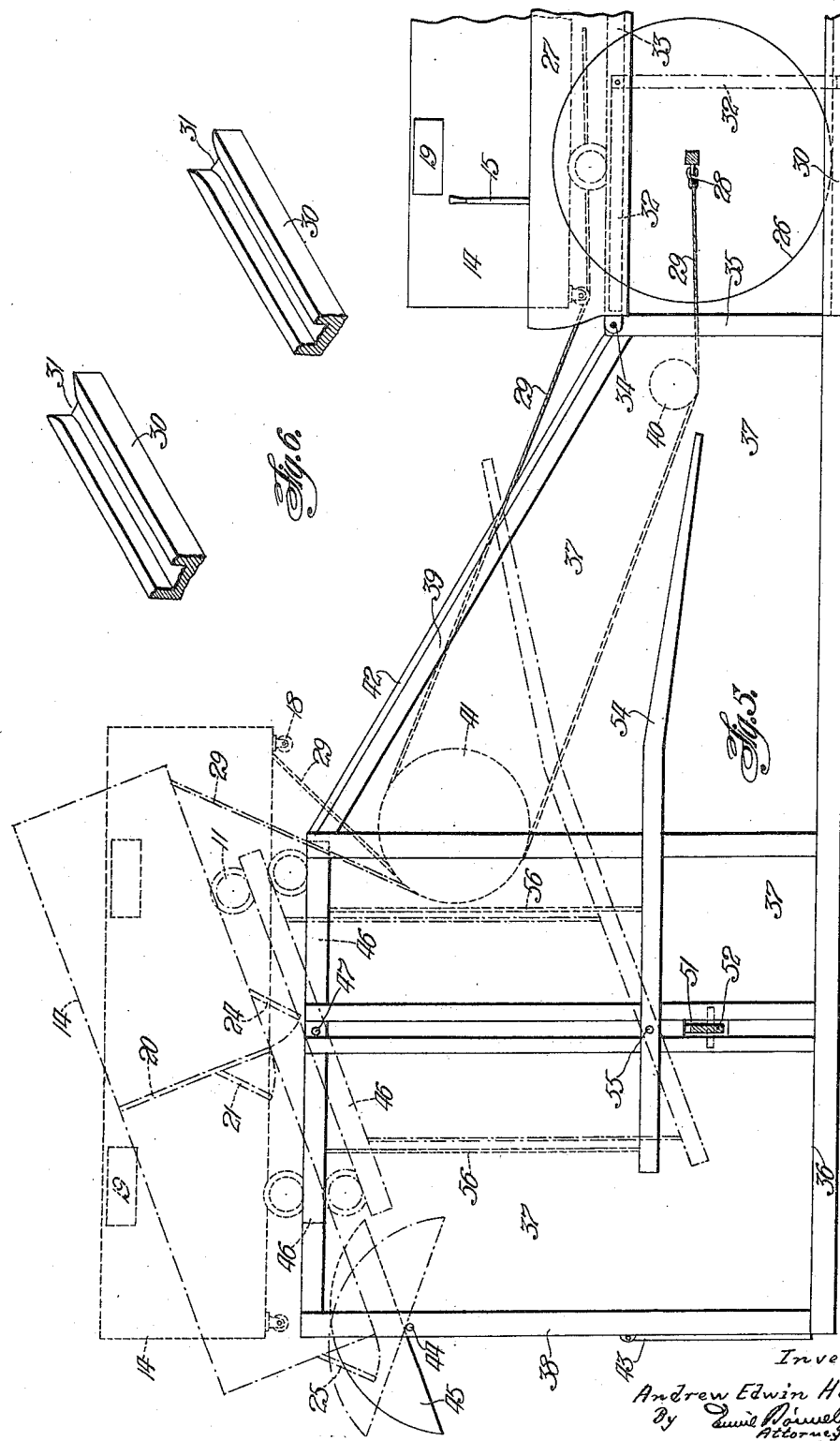

UNITED STATES PATENT OFFICE.

ANDREW E. HEATH, OF FOOTSCRAY, MELBOURNE, VICTORIA, AUSTRALIA.

APPARATUS FOR HANDLING OF GRAIN IN BULK.

1,390,032. Specification of Letters Patent. Patented Sept. 6, 1921.

Application filed December 4, 1919. Serial No. 342,462.

(GRANTED UNDER THE PROVISIONS OF THE ACT OF MARCH 3, 1921, 41 STAT. L., 1313.)

*To all whom it may concern:*

Be it known that I, ANDREW EDWIN HEATH, a subject of the King of Great Britain and Ireland, and a resident previously of Tandridge, Nyah, near Swan Hill, in the county of Tatchera, but now of 90 Francis Street, Yarraville, in the city of Footscray, a suburb of the city of Melbourne, in the county of Bourke, both in the State of Victoria, Commonwealth of Australia, (whose post office address is 90 Francis Street, Yarraville, in the said city of Footscray,) have invented certain new and useful Improvements Relating to the Apparatus for Handling of Grain in Bulk, (for which I have filed an application in Australia, Sept. 9, 1914, Patent No. 14,376,) of which the following is a specification.

This invention relates to the handling of grain or wheat in bulk and has for its object to provide for the transportation of grain in an economical manner from the harvesting machine on the farm to the silo, railway station or like place. The invention particularly aims at saving manual labor in loading and unloading the conveyance employed for transporting the grain and also provides a ready means for weighing the grain before delivery thereof. The invention further provides for the storage of the grain, if desired, and does not involve the farmer in a heavy initial outlay or in continuous maintenance expenses and also permits of the use of existing farm wagons.

Referring to the drawings which form part of this specification:—

Figure 1 is a side elevation of a truck carrier, a truck being shown thereon and portions being broken away for convenience of illustration.

Fig. 2 is a plan of the truck.

Fig. 3 is a perspective view of a directing chute.

Fig. 4 is a part sectional end elevation of a combination ramp and bin showing weighing mechanism thereof.

Fig. 5 is a side elevation of the combination ramp and bin, a truck being shown in both its weighing and delivering positions in broken lines.

Fig. 6 is a detail view of the outer ends of vehicle wheel guides.

Fig. 7 is a view of a modified ramp for use when trucks are to be projected laterally upon a wagon. In dotted lines the ramp is shown folded for transport.

Fig. 8 is a view of a modified box or truck, parts being omitted for convenience of illustration.

Fig. 9 is an inverse plan of the modified truck, portions being broken away for convenience of illustration.

Fig. 10 is a view of portion of a ramp suitable for employment when trucks are to be projected from a wagon to a silo or the like in the field.

Fig. 11 is a view of portion of a ramp to be used in conjunction with that shown in Fig. 10 when trucks are to be projected direct from the truck carrier to a silo or the like.

Fig. 12 is a sectional view of a winding gear suitable for employment with a ramp of the character shown in Figs. 10 and 11.

Fig. 13 is a plan of the winding gear.

The invention includes a truck carrier comprising a base frame having a rear portion 2 upon which are mounted two suitable rails 3. The frame is also provided with a front portion 4 above which is a ramp or incline 5. Carried at the lower end of the ramp or incline 5 are suitable lower hinge pins 6 by which the rear portion 2 is hingably attached to the front portion 4. Carried by the ramp 5 are two rails 6ª corresponding with the rails 3. Disposed at the upper end of the ramp 5 are suitable hinge pins 7 to which are pivoted wagon rails 8 corresponding with the rails 6ª. Pivotally connected to the wagon rails 8 is a suitable hinged drop support 9. Disposed below the wagon rails 8 and secured to the front portion 4 of the base frame are two wheel guides 10. The guides in cross section are preferably channel shaped and each may be provided with a flared or enlarged entrance mouth.

Engaging the rails of the rear portion 2 are four (more or less) wheels 11, each wheel being mounted upon the crank pin 12 of a crank axle 13. The axles 13 are mounted in suitable bearings carried by a truck or box 14 and are provided with suitable hand levers 15 whereby the truck may be lowered and the wheels elevated or vice versa. Carried by the truck 14, adjacent each wheel 11, is an arm or lever 16 having at its lower end a brake block or head 17.

By each lever 16 the corresponding brake block may be suitably operated whereby the truck cannot move backwardly when upon the ramp. Disposed at the front end of the truck 14 and also at the rear end of the truck are front and rear pulley wheels 18.

The truck at its top may be closed either partially or wholly and is provided with side openings projecting from which are side chutes 19. The side chutes, if desired, may be hinged and capable of being projected into the truck to close the side openings. Or sliding doors or the like may be provided. Disposed within the truck 14 is an intermediate partition 20 having at its bottom a one way hinged door 21. The partition forms a front compartment indicated at 22 and a rear compartment indicated at 23. The front compartment is provided with a drop bottom door 24 of any suitable character controlled in any well-known way. The rear compartment is provided with a back swinging door 25 of any suitable character controlled in any well-known way.

With the foregoing is used a farm wagon of any ordinary character comprising wheels 26 above which is disposed a body 27. The wagon at its front end is provided with any ordinary detachable shafts or like draft devices. At its rear end it is provided with a suitable rope attachment or attachments such as an eye 28 carried by the rear axle of the vehicle.

With the invention as so far described a truck carrier is secured in any well-known way to the rear of the farm wagon and moved along the ground therewith. The grain is delivered from the harvester into the truck 14 which is disposed upon the rear portion 2 of the base frame of the truck carrier. When the truck 14 is full or contains sufficient grain the farm wagon may be backed toward the upper end of the ramp 5. The wagon is guided in relation to the said ramp by the wheel guides 10. As the rear end of the wagon approaches the ramp, the rear edge of its bottom will strike against the depending drop support 9 which, as previously stated, is hinged to the wagon rails 8. Hence, as the wagon continues its movement toward the ramp, the drop support will be gradually elevated by the wagon bottom which will ultimately be brought beneath the support into the position indicated in Fig. 1, the said wagon bottom being slightly lower than the wagon rails 8. The rails are projected into the wagon and as the support 9 is elevated rest upon the bottom of the said wagon. The support 9 is folded or disposed between the rails. The shafts or other draft devices are now unhitched from the wagon. One end of a draw line or chain 29 is now passed over the pulley wheels 18 of the truck and secured either to the back of the wagon or the upper end of the ramp. The front end of the line 29 is secured to the rear end of the detached shafts or other draft devices carried by the horses. It is obvious from Fig. 1 that as the horses move forwardly and draw upon the line or chain 29 the truck 14 carrying the grain will be drawn up the ramp 5 into the farm wagon. The draw line 29 may now be unhitched from the horses. When the truck 14 is in position in the wagon the hand levers 15 are operated to elevate the wheels 11 of the truck 14 permitting the said truck to repose upon the floor or bottom of the wagon, thus obviating the possibility of sliding therefrom. The farm wagon is now moved away from the ramp 5 and withdrawn from the rails 8 the support 9 of which falls as the wagon is withdrawn.

The wheat contained in the truck is now transported to a railway station or like place. At the railway station or similar place the rear wheels of the wagon are backed upon channel sectioned wheel guides 30 having at their outer ends flared mouths 31. Bearing upon the ground between the guides 30 is the lower end of a drop support 32 the upper end of which is pivoted to two wagon rails 33, disposed above the said wheel guides 30. The inner ends of the wagon rails 33 by hinge pins 34 or the like are pivoted to the receiving end 35 of a combination ramp and bin, comprising a bottom 36, sides 37, and a delivery end 38. Disposed above the receiving end 35 is an inclined top 39 forming a ramp having at its lower end a lower pulley 40 and at its upper end an upper pulley 41. Disposed upon the ramp 39 are two rails 42 corresponding with the wagon rails 33. Formed in the sides, ends, or bottom of the combination ramp and bin may be a suitable discharge door or doors 43.

Disposed at the delivery end 38 of the bin is a hinge pin 44 intermediately pivoted to which is a directing chute 45. The chute may be provided with a locking pin or the like of any suitable character whereby it may be retained in either of two desired positions, as will be hereinafter understood.

Disposed at the upper end of the ramp 39 is a weighing and delivering platform. This consists of two side levers or tumblers 46 each intermediately pivoted to a cross pivot pin 47 carried by the upper ends of opposite vertically movable uprights 48. The levers correspond with the rails 42, the uprights being disposed in suitable guideways 49 formed in the sides 37 of the bin. Secured to the lower end of each upright 48 may be the upper end of an inclined connecting piece 50, the lower ends of the connecting pieces being secured to a bearing piece or dropper 51, the lower end of which rests upon the inner end of an intermediately pivoted balance beam 52 having at its outer end an adjustable or other weight 53.

Disposed at each side of the ramp and bin is a side hand lever 54, the hand levers being intermediately pivoted to a cross pivot pin 55 carried by the dropper 51. Pivoted to each hand lever are the lower ends of a pair of links 56, the upper end of each link being pivoted to the corresponding side lever 46 above the said hand lever 54. The uprights, guideways, connecting pieces, dropper and balance beam may be inclosed in any suitable way to prevent the grain encountering the same.

Upon a farmer reaching the railway station or like place with his wagon containing the truck of wheat or grain, the said wagon is backed upon the wheel guides 30, the wagon bottom engaging and elevating the hinged drop support 32 in the same way that the drop support 9 was engaged and elevated. The bottom of the wagon being slightly lower than the wagon rails 33 permits of the said rails being projected into the said wagon. When the support 32 is raised the rails 33 rest upon the bottom of the wagon. The hand levers 15 are now operated to engage the wheels 11 with the rails 33. One end of the line or chain 29 before mentioned (or a second line may be used) is now secured to the forward end of the truck, that is, the end of the truck distant from the ramp. The said line is passed successively over the pulleys 40 and 41 of the inclined ramp 39. The front end of the line 29 is then secured to the eye 28 on the back axle of the wagon. It is obvious that when the horses pull the wagon away from the ramp 39 the line 29 secured to the wagon will cause the truck 14 to be drawn from the said wagon and moved up the ramp. To prevent the grain running from one end of the truck to the other or overflowing from the same, the intermediate partition 20 is provided. The one way hinged door 21 prevents the grain from moving backwardly when the truck is traveling to the weighing and delivering platform. When the truck reaches the side levers 46, the uprights 48 move downwardly under the weight of the truck load of grain thereby operating the balance beam 52. To discharge the wheat from the truck, either of the hand levers 54 is operated causing the side levers 46 to pivot upon the pins 47, the said levers then assuming an inclined position. The truck may be prevented from moving upon the inclined levers 46 by means of the brake blocks 17 which may be controlled in any well-known way. In addition, the draw line 29 attached to the wagon prevents any sudden movement of the truck. Any suitable additional means may also be employed. Should it be desired to discharge the wheat into a railway truck or other vehicle, the said vehicle is disposed beneath the intermediately pivoted directing chute 45 which is inclined outwardly. The rear swinging door 25 of the truck is now opened and the grain runs from the said truck into the chute 45. The one way hinged door 21 permits of the grain in the front compartment 22 freely moving into the rear compartment 23. Should it, however, be desired to discharge the grain into the bin, the intermediately pivoted directing chute is inclined inwardly. The drop door 24 of the front compartment may now be opened in addition to the rear swinging door 25. It is obvious that the grain discharging from the rear compartment 23 will be diverted into the bin by the chute 45.

When the truck is empty, the hand levers 54 are manipulated and the truck is again disposed in a horizontal position. The farm wagon is now backed again toward the lower end of the ramp thereby permitting the said truck to slide down the said ramp under the control of the draw line 29. The truck may be started upon the ramp by hand. It is obvious that as the truck runs down the rails 42 of the ramp 39 it will be projected upon the wagon rails 33 within the farm wagon. The hand levers 15 may now be manipulated thereby resting the truck 14 upon the bottom of the wagon and lifting the wheels 11 from the wagon rails 33. The draw line 29 is unfastened and the wagon may be moved from the ramp. As the wagon moves from the ramp it is obvious that the hinged drop support 32 will automatically fall to the ground so that when the wagon has been withdrawn from the rails 33, the said rails are maintained in a correct horizontal position to receive the next wagon. The support 32 may be placed erect by hand if necessary.

In the construction illustrated in Fig. 7, which is at present considered the most important form of the invention, a separate ramp or incline may be used in lieu of the ramp or incline 5. This construction is employed when a series of trucks are to be accommodated laterally upon a wagon instead of a single truck being disposed longitudinally thereon. The wagon is then provided with a series of lateral rails 57. The modified ramp consists of two lower rails 58, the lower ends of which are connected at 57ª to the rails 3 of the truck carrier. Carried by the upper end of each rail 58 is a lower hinge pin 59, pivoted to which is the lower end of an upper rail 60. Carried by the upper end of each upper rail 60 is a hinge pin 61 pivoted to which is a suitable rail extension 62 by which the ramp may be attached to the wagon. Carried by the ramp is a suitable guide pulley 63. Disposed below the meeting ends of the lower and upper rails may be suitable locking lugs 64 extending between which and the said rails are braces or stays 65. Any suitable device may be employed to lock the lugs 64 together when the ramp is in use. In this way a folding or collapsible ramp is provided whereby trucks may be projected from the truck carrier onto the wagon which is moved in relation to the ramp as each truck is mounted upon said wagon.

In the modification shown in Figs. 8 and 9, the truck or box may be provided with a suitable undercarriage or frame from which the sides and ends are removable. The sides and ends of the said truck or box may also comprise suitable super-imposed and separate sections interlocked in any desired manner. The movement of the wheels in relation to the truck by cranked axles may be dispensed with. The front compartment is provided with a drop door 66 and the rear compartment with a drop door 67. The rear compartment is also provided with a backwardly swinging door 68. The drop doors are employed when discharging grain into a silo or the like. The backwardly swinging door is employed should it be necessary to discharge the grain from the wagon by tipping or inclining the same. Engaging the front drop door 66 are two front locking rods 69, pivoted to the rear ends of which are the outer ends of intermediately pivoted links 70. Pivoted to the inner end of each of the links 70 is the front end of a rear sliding locking rod 71, the rear end of which engages the rear drop door 67. Carried by the front locking rods 69 is an operating bar 73 controlled by a hand lever or the like 74. The backwardly swinging door 68 may be retained closed and opened at will by any suitable and similar locking devices. When it is desired to discharge the contents of a truck into a silo, bin or the like, the hand lever 74 is operated causing the bar 73 to move the front and rear locking rods 69 and 71 toward each other, thereby permitting the drop doors 66 and 67 to fall and the contents of the truck to be discharged.

In a further modification illustrated in Figs. 10 and 11 provision is made for projecting a truck either direct from the truck carrier or from the wagon to a silo or the like in the field. The modification comprises a portable sectional ramp having a lower section comprising two lower rails 75, the lower ends of which are connected to the rails 3 of the truck carrier. Carried by the upper end of each rail 75 is a hinge pin 76 pivoted to which is the lower end of an intermediate rail 77. Said rails 75 and 77 may, if desired, be supported by any suitable collapsible framework, whereby this section of the ramp may be compactly folded. With the lower section is used a main section comprising rails 78, the lower ends of which engage the upper ends of the rails 77. The upper end of each rail 78 carries a hinge pin 79. Pivotally connected to each pin 79 is the lower end of a rail 80. The rails 80 are carried by a suitable framework 81 having an upper guide pulley 82 and a lower guide pulley 83.

Disposed below the framework 81 are supporting wheels 84 each mounted upon an axle 85 carried by the short arm 86 of a crank lever 87. Each crank lever is pivotally mounted upon a pivot pin 88 carried by the framework. Slidably mounted in the framework 81 is a suitable draft pole 89.

With this modified construction the lower section of the ramp may be folded and carried by the main section of the ramp or by the wagon when not in use. Should it be desired to transport the ramp from one position to another, the crank levers are operated causing the supporting wheels 84 to bear the weight of the ramp. The draft pole may be attached to the end of the wagon by which the ramp may be drawn to any desired position.

Should it be desired to discharge grain direct from trucks into a silo or the like, the ramp is disposed adjacent or over the said silo, the crank levers being operated to rest the ramp upon the ground. The lower section is connected to the main section of the ramp and the truck carrier drawn to or disposed adjacent the lower ends of the rails 75. It will be obvious that by passing a draw line around the upper and lower guide pulleys, trucks may be projected up the ramp and to the silo.

With the construction represented in Figs. 10 and 11 there may be used a portable winding gear. This consists of a framework 90 carrying suitable bearings in which is mounted a vertical spindle 91. Secured to the spindle 91 is a winding drum 92 and, if desired, a brake drum 93. Fixed upon the spindle 91 is a ratchet wheel 94. Engaging the teeth of the ratchet wheel 94 is the inner end of a pawl 95, the outer end of which is pivoted to an intermediately pivoted lever 96 controlled by a foot or hand operated lever or rod 97. The pawl and its operating gear are carried by a draft pole 98, the inner end of which is loosely mounted upon the spindle and the outer end of which carries suitable draft devices. Engaging the brake drum is a suitable brake 99. The outer end of a draw line may be attached to the winding drum which by rotation causes a truck to be projected up the modified ramp to a silo. When it is desired to lower the truck down the ramp, the pawl is disengaged from the ratchet wheel and the speed of the descending truck controlled by applying the brake 99 to the brake drum 93.

Having now described my invention what I claim as new and desire to secure by Letters Patent is:—

1. In grain-handling apparatus, the combination of a pair of horizontal rails and a ramp including a pair of inclined rails disposed in endwise alinement with the horizontal rails and pivoted thereto at their lower ends, said horizontal rails and ramp being portable bodily as a unit; a truck; and a draw line connected to the truck to haul it along the horizontal rails and then onto and upwardly along the ramp rails.

2. Grain-handling apparatus, comprising a truck carrier portable bodily as a unit and consisting of a pair of base rails adapted to be supported upon the ground and a ramp including a pair of inclined rails disposed above and in endwise alinement with the base rails and pivotally connected thereto at their lower ends; a truck; and a draw line by the manipulation of which the truck is caused to travel along the base rails and then onto and upwardly along the ramp rails.

3. In grain-handling apparatus, the combination of a pair of horizontal rails and a ramp including a pair of inclined rails disposed in endwise alinement with the horizontal rails and pivoted thereto at their lower ends, the horizontal rails and the ramp being portable bodily as a unit and the ramp rails embodying upper and lower sections which are movable relatively to each other to permit the alternative extension or collapse of the ramp; a truck; and a draw line connected to the truck to haul it along the horizontal rails and then onto and upwardly along the ramp rails.

4. In grain-handling apparatus, the combination of a truck carrier portable bodily as a unit and consisting of a pair of base rails adapted to be supported upon the ground and a ramp including a pair of inclined rails disposed above and in endwise alinement with the base rails and pivotally connected thereto at their lower ends, said ramp rails embodying upper and lower sections which are movable relatively to each other to permit the alternative extension or collapse of the ramp; a truck; and a draw line by the manipulation of which the truck is caused to travel along the base rails and then onto and upwardly along the ramp rails.

5. In grain-handling apparatus, a ramp comprising upper and lower inclined rail sections movable into and out of alinement and having coacting locking lugs at their meeting ends to retain them in alinement, and brace connections between said lugs and the respective rail sections.

6. In grain-handling apparatus, a ramp comprising upper and lower inclined rail sections movable into and out of alinement and having coacting locking lugs at their meeting ends to retain them in alinement, and brace connections between said lugs and the respective rail sections; a wagon having lateral rails thereon; and pivotal connections between the wagon rails and the upper ends of the upper ramp rail sections to enable the ramp to be transported bodily with the wagon.

7. In grain-handling apparatus, the combination of a truck carrier comprising ground rails and a ramp including a pair of inclined rails disposed in endwise alinement with the ground rails and pivoted to the same at their lower ends; a truck having lateral rails thereon; and connections between the wagon rails and the upper ends of the ramp rails to enable the truck carrier to be moved bodily with the wagon.

In testimony whereof I affix my signature.

A. E. HEATH.

Witness:
  G. A. WREN.